(12) United States Patent
Collins et al.

(10) Patent No.: US 6,790,590 B2
(45) Date of Patent: Sep. 14, 2004

(54) INFRARED ABSORBING COMPOUNDS AND THEIR USE IN IMAGEABLE ELEMENTS

(75) Inventors: Jeffrey Collins, Greeley, CO (US);
Ting Tao, Fort Collins, CO (US);
Thomas Jordan, Windsor, CO (US)

(73) Assignee: Kodak Polychrome Graphics, LLP, Norwalk, CT (US)

( * ) Notice: Subject to any disclaimer, the term of this patent is extended or adjusted under 35 U.S.C. 154(b) by 55 days.

(21) Appl. No.: 10/353,106

(22) Filed: Jan. 27, 2003

(65) Prior Publication Data

US 2004/0144277 A1 Jul. 29, 2004

(51) Int. Cl.[7] .......................... G03F 7/004; G03F 7/11
(52) U.S. Cl. .................... 430/270.1; 430/271.1; 430/273.1; 430/281.1; 430/302; 430/309; 430/434; 430/494; 430/944; 430/945; 430/964; 548/455
(58) Field of Search ................ 430/270.1, 271.1, 430/273.1, 281.1, 302, 309, 434, 494, 944, 945, 964; 548/455

(56) References Cited

U.S. PATENT DOCUMENTS

| | | | |
|---|---|---|---|
| 4,708,925 A | 11/1987 | Newman | 430/270 |
| 5,372,907 A | 12/1994 | Haley et al. | 430/157 |
| 5,466,557 A | 11/1995 | Haley et al. | 430/278 |
| 5,763,134 A | 6/1998 | Busman et al. | 430/157 |
| 5,919,601 A | 7/1999 | Nguyen et al. | 430/278.1 |
| 5,965,319 A | 10/1999 | Kobayashi | 430/176 |
| 6,090,532 A | 7/2000 | West et al. | 430/326 |
| 6,280,899 B1 | 8/2001 | Parsons et al. | 430/270.1 |
| 6,309,792 B1 | 10/2001 | Hauck et al. | 430/270.1 |
| 6,358,669 B1 * | 3/2002 | Savariar-Hauck et al. | 430/273.1 |
| 6,410,203 B1 | 6/2002 | Nakamura | 430/270.1 |
| 2002/0068241 A1 | 6/2002 | Oohashi et al. | 430/288.1 |
| 2002/0136961 A1 | 9/2002 | McCullough et al. | 430/5 |

FOREIGN PATENT DOCUMENTS

| | | |
|---|---|---|
| EP | 0823659 B1 | 12/1999 |
| EP | 0819980 B1 | 5/2000 |
| EP | 0773112 B1 | 5/2001 |
| EP | 0819985 B1 | 6/2002 |
| JP | 10-153853 | 6/1998 |
| JP | 2002-049147 | 2/2002 |
| JP | 2002/144750 | 5/2002 |
| WO | 00/17711 | 3/2000 |
| WO | 02/46507 A2 | 6/2002 |

* cited by examiner

Primary Examiner—Barbara Gilliam
(74) Attorney, Agent, or Firm—RatnerPrestia

(57) ABSTRACT

Infrared absorbing compounds in which both the anion and the cation absorb infrared radiation, imageable elements that contain these compounds, and methods for forming images using the imageable elements are disclosed. The compounds have the structure:

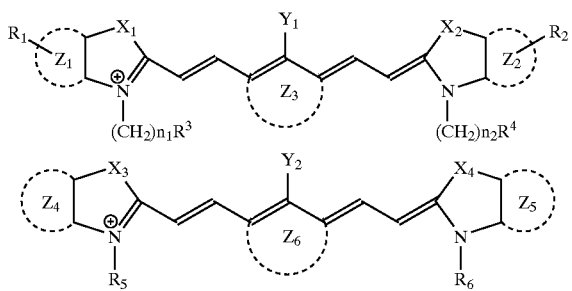

in which $Y_1$ and $Y_2$ are each independently hydrogen, halo, alkyl, diphenylamino, or phenylthio; $R_1$, $R_2$, $R_3$, and $R_4$ are each independently hydrogen, methyl, or $SO_3^-$, with the proviso that two of $R_1$, $R_2$, $R_3$, and $R_4$ are $SO_3^-$; $R_5$ and $R_6$ are each independently an alkyl group; $Z_1$, $Z_2$, $Z_4$, and $Z_5$ are each independently a benzo group or a naphtho group; $Z_3$ and $Z_6$ are each independently two hydrogen atoms, a cyclohexene residue, or a cyclopentene residue; $X_1$, $X_2$, $X_3$, and $X_4$ are each independently S, O, NH, $CH_2$, or $C(CH_3)_2$; and $n_1$ and $n_2$ are each independently 0 to 4.

28 Claims, 1 Drawing Sheet

FIGURE 1

INFRARED ABSORBING COMPOUNDS AND THEIR USE IN IMAGEABLE ELEMENTS

FIELD OF THE INVENTION

This invention relates to infrared absorbing compounds and to imageable elements that contain these compounds. More particularly, this invention relates to infrared absorbing compounds in which both the anion and the cation absorb near infrared and/or infrared radiation.

BACKGROUND OF THE INVENTION

In lithographic printing, ink receptive regions, known as image areas, are generated on a hydrophilic surface. When the surface is moistened with water and ink is applied, the hydrophilic regions retain the water and repel the ink, and the ink receptive regions accept the ink and repel the water. The ink is transferred to the surface of a material upon which the image is to be reproduced. Typically, the ink is first transferred to an intermediate blanket, which in turn transfers the ink to the surface of the material upon which the image is to be reproduced.

Imageable elements useful as lithographic printing plate precursors typically, comprise an imageable layer applied over the hydrophilic surface of a substrate. The imageable layer includes one or more radiation-sensitive components, which may be dispersed in a suitable binder. Alternatively, the radiation-sensitive component can also be the binder material. If, after imaging, the imaged regions of the imageable layer are removed in the developing process revealing the underlying hydrophilic surface of the substrate, the precursor is positive-working. Conversely, if the unimaged regions are removed by the developing process, the precursor is negative-working. In each instance, the regions of the imageable layer (i.e., the image areas) that remain are ink-receptive, and the regions of the hydrophilic surface revealed by the developing process accept water and aqueous solutions, typically a fountain solution, and repel ink.

Direct digital imaging of offset printing plates, which obviates the need for imaging through a negative, is becoming increasingly important in the printing industry. Negative-working, alkaline developable imageable elements that comprise compounds that form an acid on thermal imaging have been developed for use with infrared lasers. For example, Haley, U.S. Pat. No. 5,372,907, discloses a radiation-sensitive composition that is sensitive to both ultraviolet and infrared radiation. The composition comprises (1) a resole resin, (2) a novolac resin, (3) an acid generator, and (4) an infrared absorbing compound.

Although acid generation is relatively efficient in systems in which the acid is generated by imaging with ultraviolet radiation, it is less efficient in which the acid is generated by imaging with near infrared and infrared radiation (700 nm to 3000 nm). In addition, the infrared absorbing compounds typically have counter ions that contain halogen and/or heavy metals, such as arsenic or antimony, materials that can cause environmental contamination. When the imaged elements are heated after imaging, highly corrosive acids, such as hydrochloric acid, can be formed and released into the atmosphere. Thus, a need exists for a more efficient method for forming images by direct digital imaging with infrared radiation that does not require an infrared absorbing compound that contains halogen or a heavy metal.

SUMMARY OF THE INVENTION

In one aspect, the invention is an infrared absorbing compound. The infrared absorbing compound has the structure:

Structure I in which:

Y$_1$ and Y$_2$ are each independently hydrogen, halo, alkyl, diphenylamino, or phenylthio;

R$_1$, R$_2$, R$_3$, and R$_4$ are each independently hydrogen, methyl, or SO$_3^-$, with the proviso that two of R$_1$, R$_2$, R$_3$, and R$_4$ are SO$_3^-$;

R$_5$ and R$_6$ are each independently an alkyl group;

Z$_1$, Z$_2$, Z$_4$, and Z$_5$ are each independently a benzo group or a naphtho group;

Z$_3$ and Z$_6$ are each independently two hydrogen atoms, a cyclohexene residue, or a cyclopentene residue;

X$_1$, X$_2$, X$_3$, and X$_4$ are each independently S, O, NH, CH$_2$, or C(CH$_3$)$_2$; and n$_1$ and n$_2$ are each independently 0 to 4.

In another aspect, the invention is an imageable element comprising the infrared absorbing compound. In another aspect, the invention is a method for forming an image by imaging the imageable element with infrared radiation and developing the imaged imageable element.

When used as photothermal conversion materials in imageable elements, these infrared absorbing compounds provide an efficient method for forming images by direct digital imaging with near infrared and/or infrared radiation. Because each compound contains two chromaphores, they are efficient absorbers of a wide range of infrared and near infrared radiation. They improve both the dot stability and sensitivity of imageable elements. In addition, they are halogen free and contain no heavy metals such as arsenic or antimony.

DETAILED DESCRIPTION OF THE INVENTION

Unless the context indicates otherwise, in the specification and claims, the terms infrared absorbing compound, novolac resin, resole resin, polymeric binder, acid activatable crosslinking agent, acid generator, and similar terms include mixtures of such materials. Unless otherwise specified, all percentages are percentages by weight. Thermal imaging refers to imaging either with a hot body or with an infrared laser.

Infrared Absorbing Compounds

The structure of the infrared absorbing compounds is shown in Structure I, above. The infrared absorbing compounds comprise an anion that absorbs infrared radiation and a cation that absorbs infrared radiation. Both the anion and the cation absorb radiation in the range of about 700 nm to about 3000 nm, preferably about 750 nm to about 1200 nm. The anion has two $SO_3^-$ groups.

Referring to Structure I, $Y_1$ and $Y_2$ are each independently hydrogen, halo, alkyl, diphenylamino, or phenylthio. Typical halo groups are chloro and bromo. Typical alkyl groups are alkyl groups of one to four carbon atoms, such as methyl, ethyl, i-propyl, n-propyl, t-butyl and n-butyl. Typically, $Y_1$ and $Y_2$ are each independently hydrogen, chloro, phenylthio, or diphenylamino.

$R_1$, $R_2$, $R_3$, and $R_4$ are each independently hydrogen, methyl, or $SO_3^-$ groups. Two of $R_1$, $R_2$, $R_3$, and $R_4$ are $SO_3^-$ groups, so that the anion has two $SO_3^-$ groups and has an overall charge of minus one.

$R_5$ and $R_6$ are each independently an alkyl group. Typical alkyl groups are alkyl groups of one to four carbon atoms, such as methyl, ethyl, i-propyl, n-propyl, t-butyl and n-butyl.

$Z_1$, $Z_2$, $Z_4$, and $Z_5$ are each independently a benzo group or a naphtho group, that is, $Z_1$, $Z_2$, $Z_4$, and $Z_5$ each independently represent either a benzo moiety or a naphtho moiety.

$Z_3$ and $Z_6$ are each independently two hydrogen atoms, a cyclohexene residue or a cyclopentene residue. That is, $Z_3$ and/or $Z_6$ may represent either a cyclohexene ring or a cyclopentene ring. Alternatively, the compound may be an open chain compound, in which $Z_3$ and/or $Z_6$ is two hydrogen atoms. In this case the structure is represented by —CH=C(Y)—CH=.

$X_1$, $X_2$, $X_3$, and $X_4$ are each independently S, O, NH, $CH_2$, or $C(CH_3)_2$. Typically, $X_1$, $X_2$, $X_3$, and $X_4$ are each $C(CH_3)_2$.

$n_1$ and $n_2$ are each independently 0 to 4, preferably 1 to 4.

In one embodiment, $R_1$ and $R_2$ are the same; $R_3$ and $R_4$ are the same; $R_5$ and $R_6$ are the same; $Z_1$ and $Z_2$ are the same; $Z_4$, and $Z_5$ are the same; $X_1$ and $X_2$ are the same; $X_3$, and $X_4$ are the same; and $n_1$ and $n_2$ are the same.

The infrared absorbing compounds may be prepared by mixing a solution of a salt that contains the desired infrared absorbing cation with a solution of a salt that contains the desired infrared absorbing anion and filtering off the resulting precipitate. The anion of the salt that contains the desired infrared absorbing cation is typically, for example, sulfate, bisulfate, or halide, such as chloride or bromide. The cation of the salt that contains the desired anion is typically ammonium, substituted ammonium such as trimethyl ammonium or tri-n-butyl ammonium, lithium, sodium, or potassium. The solvent may be water or a solvent including a mixture of water and a hydrophilic solvent such as alcohol.

The infrared absorbing compounds are useful as photothermal conversion materials. Photothermal conversion materials absorb radiation, typically infrared radiation, and convert it to heat. Imageable elements that are to be imaged with infrared radiation typically comprise a photothermal conversion material. Although a photothermal conversion material is not necessary for imaging, imageable elements that contain a photothermal conversion material may also be imaged with hot body, such as a thermal head or an array of thermal heads. In thermally imageable elements that do not comprise an underlayer, the photothermal conversion material may be in the imageable layer and/or in a separate absorber layer between the imageable layer and the substrate. In elements that also comprise an underlayer, the photothermal conversion material may be in the imageable layer, and/or in the underlayer, and/or in a separate absorber layer between the imageable layer and the underlayer.

The amount of photothermal conversion material in the element is generally sufficient to provide an optical density of at least 0.05, and preferably, an optical density of about 0.5 to about 2 at the imaging wavelength. As is well known to those skilled in the art, the amount of photothermal conversion material required to produce a particular optical density can be determined from the thickness of the layer, the concentration of photothermal conversion material in the layer, and the extinction coefficient of the photothermal conversion material at the wavelength used for imaging using Beer's law.

Imageable Element

The imageable element comprises a layer of imageable composition over the surface of a substrate. Other layers that are conventional components of imageable elements may also be present. For example, the imageable layer may be on the substrate, or other layers, such as an underlayer or an absorber layer, may be present between the imageable layer and the substrate.

Negative Working Imageable Compositions

The imageable composition may be a negative working imageable composition. These compositions comprise the infrared absorbing compound, also called the photothermal conversion material; an acid generator; an acid activatable crosslinking agent; and a polymeric binder. Other ingredients that are conventional ingredients of negative working imageable compositions may also be present. These compositions are disclosed, for example, in Haley, U.S. Pat. No. 5,372,907; Nguyen, U.S. Pat. No. 5,919,601; Kobayashi, U.S. Pat. No. 5,965,319; and Busman, U.S. Pat. No. 5,763,134, the disclosures of which are all incorporated herein by reference.

Acid generators are precursors that form a Brönsted acid by thermally initiated decomposition. Non-ionic acid generators include, for example, haloalkyl-substituted s-triazines, which are described, for example, in Smith, U.S. Pat. No. 3,779,778. Haloalkyl-substituted s-triazines are s-triazines substituted with 1 to 3 $CX_3$ groups in which is X is bromo or, preferably, chloro. Examples include 2-phenyl-4,6-bis(trichloromethyl)-s-triazine, 2,4,6-tris (trichloromethyl)-s-triazine, 2-methyl-4,6-bis (trichloromethyl)-s-triazine, 2-styryl-4,6-bis (trichloromethyl)-s-triazine, 2-(p-methoxystyryl)-4,6-bis (trichloromethyl)-s-triazine, 2-(4-methoxy-naphtho-1-yl)-4, 6-bis-trichloromethyl-s-triazine, 2-(4-ethoxy-naphtho-1-yl)-4,6-bis-trichloromethyl-s-triazine, and 2-[4-(2-ethoxyethyl)-naphtho-1-yl]-4,6-bis-trichloromethyl-s-triazine).

Ionic acid generators include, for example, onium salts in which the onium cation is iodonium, sulphonium, phosphonium, oxysulphoxonium, oxysulphonium, sulphoxonium, ammonium, diazonium, selenonium, or arsonium, and the anion is a non-nucleophilic anion such as tetra-fluoroborate, hexafluorophosphate, hexafluoroarsenate, hexafluoroantimonate, triflate, tetrakis (pentafluoro-phenyl)borate, pentafluoroethyl sulfonate, p-methyl-benzyl sulfonate, ethyl sulfonate, trifluoromethyl acetate, and pentafluoroethyl acetate. Typical onium salts include, for example, diphenyl iodonium chloride, diphenyl iodonium hexafluorophosphate, diphenyl iodonium hexafluoroantimonate, 4,4'-dicumyl iodonium chloride, 4,4'-dicumyl iodonium hexafluorophosphate, N-methoxy-α- picolinium-p-toluene sulfonate, 4-methoxybenzenediazonium tetrafluoroborate, 4,4'-bis-dodecylphenyl iodonium-hexafluoro phosphate, 2-cyanoethyl-triphenylphosphonium chloride, bis-[4-diphenylsulfoniophenyl]sulfide-bis-hexafluoro phosphate, bis-4-dodecylphenyliodonium hexafluoroantimonate, triphenyl sulfonium hexafluoroantimonate, triphenyl sulfonium tetrafluoroborate, 2-methoxy-4-aminophenyl diazonium hexafluorophosphate, phenoxyphenyl diazonium hexafluoroantimonate, and anilinophenyl diazonium hexafluoroantimonate.

Particularly useful ionic acid generators include iodonium, sulfonium, and diazonium salts in which the anion is an organic sulfate or thiosulfate, such as, for example, methyl sulfate or thiosulfate, ethyl sulfate or thiosulfate, hexyl sulfate or thiosulfate, octyl sulfate or thiosulfate, decyl sulfate or thiosulfate, dodecyl sulfate and thiosulfate, trifluoromethyl sulfate or thiosulfate, benzyl sulfate or thiosulfate, pentafluorophenyl sulfate and thiosulfate. Typical acid generators include, for example, diphenyl iodonium octyl sulfate, diphenyl iodonium octyl thiosulfate, triphenyl sulfonium octyl sulfate, 4,4'-dicumyl iodonium p-tolyl sulfate, 2-methoxy-4-(phenylamino)-benzenediazonium octyl sulfate, 2-methoxy-4-(phenylamino)-benzenediazonium hexadecyl sulfate, 2-methoxy-4-(phenylamino)-benzenediazonium dodecyl sulfate, and 2-methoxy-4-(phenylamino)-benzenediazonium vinyl benzyl thiosulfate. These acid generators can be prepared by mixing an onium salt, such as an onium chloride, bromide, or bisulfate, containing the desired cation with a sodium or potassium salt containing the desired anion, i.e., the desired alkyl or aryl sulfate or thiosulfate, either in water or in an aqueous solvent including a hydrophilic solvent such as an alcohol.

Acid-activatable crosslinking agents may comprise at least two acid-activatable reactive groups, such as the hydroxymethyl group, the alkoxymethyl group, the epoxy group, and the vinyl ether group, bonded to an aromatic ring. Examples include methylol melamine resins, resole resins, epoxidized novolac resins, and urea resins. Other examples are amino resins having at least two alkoxymethyl groups (e.g. alkoxymethylated melamine resins, alkoxymethylated glycolurils and alkoxymethylated benzoguanamines). Phenol derivatives comprising at least two groups such as the hydroxymethyl group and/or the alkoxymethyl group provide good fastness in an image portion when an image is formed. Examples of phenol derivatives include resole resins. Resole resins include, for example, GP649D99 resole (Georgia Pacific) and BKS-5928 resole resin (Union Carbide).

Novolac resins are typically prepared by condensation of a phenol, such as phenol, m-cresol, o-cresol, p-cresol, etc, with an aldehyde, such as formaldehyde, paraformaldehyde, acetaldehyde, etc. or a ketone, such as acetone, in the presence of an acid catalyst. One of two processes, the solvent condensation process and the hot melt condensation process, is typically used. Typical novolac resins include, for example, phenol-formaldehyde resins, cresol-formaldehyde resins, phenol-cresol-formaldehyde resins, p-t-butylphenol-formaldehyde resins, and pyrogallol-acetone resins. A useful novolac resin for use in this invention is the resin prepared from m-cresol and formaldehyde.

Resole resins are obtained by reaction of phenolic compounds with aldehydes, but under different reaction conditions than those that produce novolac resins. A typical example of a resole resin useful with novolac resins is the resole resin prepared from bis-phenol A and formaldehyde.

The acid activatable crosslinking agent used in the composition may depend on the polymeric binder. Any combination of acid activatable crosslinking agent and polymeric binder that react to form a crosslinked binder under the imaging conditions may be used. Various combinations of polymeric binder and acid activatable crosslinking agent are known in the art. In general, the binder is a polymer, or mixture of polymers, capable of undergoing an acid-catalyzed condensation reaction with the crosslinking agent when the element is heated to about 60–220° C.

For example, Haley, U.S. Pat. No. 5,372,907, discloses a radiation-sensitive composition that is sensitive to both ultraviolet/visible and infrared radiation. The composition comprises a resole resin and a novolac resin. In these compositions, the novolac resin is the polymeric binder and the resole resin is the acid-activatable crosslinking agent. Nguyen, U.S. Pat. No. 5,919,601, discloses radiation-sensitive compositions imageable by infrared and ultraviolet/visible radiation. These compositions comprise polymeric binders containing reactive pendant groups selected from hydroxy, carboxylic acid, sulfonamide, and alkoxymethylamides; and a resole resin, a $C_1$–$C_5$ alkoxymethyl melamine or glycoluril resin, a poly($C_1$–$C_5$-alkoxymethylstyrene), a poly($C_1$–$C_5$-alkoxymethylacrylamide), a derivative thereof, or a combination thereof. Preferably, the crosslinking resin is a resole resin prepared from a $C_1$–$C_5$ alkylphenol and formaldehyde; a tetra $C_1$–$C_5$-alkoxymethyl glycoluril; a polymer of (4-methoxymethylstyrene); a polymer of (N-methoxymethyl) acrylamide; a polymer of (N-i-butoxymethyl)acrylamide; or a butylated phenolic resin. Kobayashi, U.S. Pat. No. 5,965,319, discloses a negative working recording material comprising an acid activatable crosslinking agent, preferably having at least two hydroxymethyl or alkoxymethyl groups bonded to a benzene ring and a polymer compound having an alkaline-soluble group such as a novolac resin. Typical crosslinking agents are phenols containing hydroxymethyl groups, prepared by condensation of phenols with formaldehyde. Busman, U.S. Pat. No. 5,763,134, discloses activatable crosslinking agent, such as 1,3,5-trihydroxymethylbenzene, 1,3,5-triacetoxymethylbenzene, and 1,2,4,5-tetraacetoxymethylbenzene. Other polymeric binders and acid activatable crosslinking agents will be apparent to those skilled in the art.

The imageable composition may also comprise other ingredients such as dyes and surfactants that are conventional ingredients of imageable compositions. Surfactants may be present in the imageable composition as, for example, coating aids. A dye may be present to aid in the visual inspection of the exposed and/or developed element. Printout dyes distinguish the exposed regions from the unexposed regions during processing. Contrast dyes distinguish the unimaged regions from the imaged regions in the developed imageable element. Preferably the dye does not absorb the imaging radiation. Triarylmethane dyes, such as ethyl violet, crystal violet, malachite green, brilliant green, Victoria blue B, Victoria blue R, Victoria pure blue BO, and D11 may be used as contrast dyes.

The negative working imageable composition typically comprises about 0.1 to 10% by weight, more preferably about 0.5 to 10% by weight of the infrared absorbing compound (photothermal conversion material) based on the total weight of the composition. The imageable composition typically comprises about 0.01 to 50% by weight, preferably about 0.1 to 25% by weight, and more preferably about 0.5 to 20% by weight of the acid generator, based on the total weight of the composition. The imageable composition typically comprises about 5 to 70% by weight, and preferably about 10 to 65% by weight of the cross linking agent based on the total weight of the composition. The imageable composition typically comprises about 10 to 90% by weight, preferably about 20 to 85% by weight, and more preferably about 30 to 80% by weight of the polymer based on the total weight of the composition.

Positive Working Imageable Compositions

The infrared absorbing compounds may be used as the photothermal conversion materials in positive working imageable compositions. Positive working thermally imageable elements in which the imageable composition comprises a polymeric material and a dissolution inhibitor are known. The polymeric material is a water insoluble and alkali soluble binder, such as is discussed above, typically a phenolic resin, such as a novolac resin. The dissolution inhibitors are believed not to be photoreactive to radiation in the range of about 600 nm to about 800 nm or to radiation in the range of about 800 nm to about 1200 nm, the ranges of radiation typically used for imaging thermally imageable elements. The element may comprise an underlayer between the imageable layer and the substrate. The photothermal conversion material may be present in the imageable layer, in an underlayer, or in a separate absorber layer between the imageable layer and the underlayer if the underlayer is present, or between the imageable layer and the substrate if the underlayer is not present. Such systems are disclosed in, for example, Parsons, U.S. Pat. No. 6,280,899; Shimazu, U.S. Pat. No. 6,294,311, and U.S. Pat. No. 6,352,812; and Savariar-Hauck, U.S. Pat. No. 6,358,669.

Useful polar groups for dissolution inhibitors include, for example, diazo groups; diazonium groups; keto groups; sulfonic acid ester groups; phosphate ester groups; triarylmethane groups; onium groups, such as sulfonium, iodonium, and phosphonium; groups in which a nitrogen atom is incorporated into a heterocyclic ring; and groups that contain a positively charged atom, especially a positively charged nitrogen atom, typically a quaternized nitrogen atom, i.e., ammonium groups. Compounds that contain a positively charged (i.e., quaternized) nitrogen atom useful as dissolution inhibitors include, for example, tetraalkyl ammonium compounds, quinolinium compounds, benzothiazolium compounds, pyridinium compounds, and imidazolium compounds. Compounds containing other polar groups, such as ether, amine, azo, nitro, ferrocenium, sulfoxide, sulfone, and disulfone may also be useful as dissolution inhibitors.

Quaternized heterocyclic compounds are useful as dissolution inhibitors. Representative imidazolium compounds include Monazoline C (cocoate imidazoline), Monazoline O (oleic imidazoline), and Monazoline T (tall oil imidazoline) (Uniqema, Wilmington, Del., USA). Representative quinolinium dissolution inhibitors include 1-ethyl-2-methyl quinolinium iodide, 1-ethyl-4-methyl quinolinium iodide and cyanine dyes that comprise a quinolinium moiety such as Quinoldine Blue. Representative benzothiazolium compounds include 3-ethyl-2(3H)-benzothiazolylidene)-2-methyl-1-(propenyl)benzothiazolium cationic dyes and 3-ethyl-2-methylbenzothiazolium iodide. Suitable pyridinium dissolution inhibitors include cetyl pyridinium bromide and ethyl viologen dications. Diazonium salts are useful as dissolution inhibitors and include, for example, substituted and unsubstituted diphenylamine diazonium salts, such as methoxy-substituted diphenylamine diazonium hexafluoroborates.

A preferred group of dissolution inhibitors are triarylmethane dyes, such as ethyl violet, crystal violet, malachite green, brilliant green, Victoria blue B, Victoria blue R, and Victoria blue BO. These compounds can also act as contrast dyes, which distinguish the unimaged regions from the imaged regions in the developed imageable element. The dissolution inhibitor may be a monomeric and/or polymeric compound that comprises an o-diazonaphthoquinone moiety, such as is discussed above.

When a dissolution inhibitor is present in the imageable layer, it typically comprises at least about 0.1 wt %, typically about 0.5 wt % to about 30 wt %, preferably about 1 wt % to 15 wt %, based on the dry weight of the layer.

Alternatively, or additionally, the polymeric material in the imageable layer can comprise polar groups that act as acceptor sites for hydrogen bonding with the hydroxy groups present in the polymeric material and, thus, act as a both the polymeric material and dissolution inhibitor. Derivatization of the hydroxyl groups increases molecular weight of the polymeric material and reduces the number of hydroxyl groups, typically reducing both the solubility and the rate of dissolution of the polymeric material in the developer. Although is important that the level of derivatization be high enough that the polymeric material acts as a dissolution inhibitor, it should not be so high that, following thermal imaging, the polymeric material is not soluble in the developer. Derivatization of phenolic resins with compounds that contain the diazonaphthoquinone moiety is well known and is described, for example, in West, U.S. Pat. Nos. 5,705,308, and 5,705,322.

Although the degree of derivatization required will depend on the nature of the polymeric material and the nature of the moiety containing the polar groups introduced into the polymeric material, typically about 0.5 mol % to about 5 mol %, preferably about 1 mol % to about 3 mol %, of the hydroxyl groups will be derivatized. These derivatized polymeric materials can be used alone in the imageable layer, or they can be combined with other polymeric materials and/or dissolution inhibitors.

One group of polymeric materials that comprise polar groups and function as dissolution inhibitors are derivatized phenolic polymeric materials in which a portion of the phenolic hydroxyl groups have been converted to sulfonic acid esters, preferably phenyl sulfonates or p-toluene sulfonates. Derivatization can be carried out by reaction of the polymeric material with, for example, a sulfonyl chloride such as p-toluene sulfonyl chloride in the presence of a base such as a tertiary amine. A useful material is a novolac resin in which about 1 mol % to 3 mol %, preferably about 1.5 mol % to about 2.5 mol %, of the hydroxyl groups have been converted to phenyl sulfonate or p-toluene sulfonate (tosyl) groups.

It will be appreciated by those skilled in the art that although phenolic polymers which have been derivatized with polar groups (e.g., polymers in which some of the hydroxyl groups have been derivatized with sulfonic acid ester groups or with groups that contain the diazonaphthoquinone moiety) are soluble in aqueous alkaline developer, a layer comprising or consisting essentially of one or more of these materials is "insoluble" in aqueous alkaline developer. This is because solubility and insolubility of the layer are determined by the relative rates at which the imaged and unimaged regions of the layer are removed by the developer. Following thermal imaging of a layer comprising or consisting essentially of one or more of these derivatized phenolic polymeric materials, the imaged regions of the layer are removed by the aqueous alkaline developer more rapidly than the unimaged regions. If development is carried out for an appropriate time, the imaged regions are removed and the unimaged regions remain, so that an image made up of the unimaged regions is formed. Hence the imaged regions are "removable" or "soluble" in the developer and the unimaged regions are "not removable" or "insoluble" in the developer.

When the imageable element comprises an underlayer, the polymeric material in the underlayer is preferably soluble in an alkaline developer. In addition, this polymeric material is preferably insoluble in the solvent used to coat the imageable layer so that the imageable layer can be coated over the underlayer without dissolving the underlayer. Polymeric materials useful in the underlayer include those that contain an acid and/or phenolic functionality, and mixtures of such materials. Useful polymeric materials include carboxy functional acrylics, vinyl acetate/crotonate/vinyl neodecanoate copolymers, styrene maleic anhydride copolymers, phenolic resins, maleated wood rosin, and combinations thereof. Underlayers that provide resistance both to fountain solution and aggressive washes are disclosed in Shimazu, U.S. Pat. No. 6,294,311, incorporated herein by reference.

Particularly useful polymeric materials are copolymers that comprise N-substituted maleimides, especially N-phenylmaleimide; polyvinylacetals; methacrylamides, especially methacrylamide; and acrylic and/or methacrylic acid, especially methacrylic acid. More preferably, two functional groups are present in the polymeric material, and most preferably, all three functional groups are present in the polymeric material. The preferred polymeric materials of this type are copolymers of N-phenylmaleimide, methacrylamide, and methacrylic acid, more preferably those that contain about 25 to about 75 mol %, preferably about 35 to about 60 mol % of N-phenylmaleimide; about 10 to about 50 mol %, preferably about 15 to about 40 mol % of methacrylamide; and about 5 to about 30 mol %, preferably about 10 to about 30 mol %, of methacrylic acid. Other hydrophilic monomers, such as hydroxyethyl methacrylate, may be used in place of some or all of the methacrylamide. Other alkaline soluble monomers, such as acrylic acid, may be used in place of some or all of the methacrylic acid.

Another group of preferred polymeric materials for the polymeric material in the underlayer are alkaline developer soluble copolymers that comprise a monomer that has a urea bond in its side chain (i.e., a pendent urea group), such as are disclosed in Ishizuka, U.S. Pat. No. 5,731,127. These copolymers comprise about 10 to 80 wt %, preferably about 20 to 80 wt %, of one or more monomers represented by the general formula:

in which R is —H or —CH$_3$; X is a bivalent linking group; Y is a substituted or unsubstituted bivalent aromatic group; and Z is —OH, —COOH, or —SO$_2$NH$_2$.

R is preferably —CH$_3$. Preferably X is a substituted or unsubstituted alkylene group, substituted or unsubstituted phenylene [-(C$_6$H$_4$)-] group, or substituted or unsubstituted naphthalene [-(C$_{10}$H$_6$)-] group; such as -(CH$_2$)$_n$-, in which n is 2 to 8; 1,2-, 1,3-, and 1,4-phenylene; and 1,4-, 2,7-, and 1,8-naphthalene. More preferably X is unsubstituted and even more preferably n is 2 or 3; most preferably X is -(CH$_2$CH$_2$)-. Preferably Y is a substituted or unsubstituted phenylene group or substituted or unsubstituted naphthalene group; such as 1,2-, 1,3-, and 1,4-phenylene; and 1,4-, 2,7-, and 1,8-naphthalene. More preferably Y is unsubstituted, most preferably unsubstituted 1,4-phenylene. Z is —OH, —COOH, or —SO$_2$NH$_2$, preferably —OH. A preferred monomer is:

in which Z is —OH, —COOH, or —SO$_2$NH$_2$, preferably —OH.

In the synthesis of a copolymer, one or more of the urea group containing monomers may be used. The copolymers also comprise 20 to 90 wt % other polymerizable monomers, such as maleimide, acrylic acid, methacrylic acid, acrylic esters, methacrylic esters, acrylonitrile, methacrylonitrile, acrylamides, and methacrylamides. A copolymer that comprises in excess of 60 mol % and not more than 90 mol % of acrylonitrile and/or methacrylonitrile in addition to acrylamide and/or methacrylamide provides superior physical properties. More preferably the alkaline soluble copolymers comprise 30 to 70 wt % urea group containing monomer; 20 to 60 wt % acrylonitrile or methacrylonitrile, preferably acrylonitrile; and 5 to 25 wt % acrylamide or methacrylamide, preferably methacrylamide.

Another group of polymeric materials that are useful in the underlayer include alkaline developer soluble copolymers that comprise about 10 to 90 mol % of a sulfonamide monomer unit, especially those that comprise N-(p-aminosulfonylphenyl)methacrylamide, N-(m-aminosulfonylphenyl)methacrylamide, N-(o-aminosulfonylphenyl)methacrylamide, and/or the corresponding acrylamide. Useful alkaline developer soluble polymeric materials that comprise a pendent sulfonamide group, their method of preparation, and monomers useful for their preparation, are disclosed in Aoshima, U.S. Pat. No. 5,141,838. Particularly useful polymeric materials comprise (1) the sulfonamide monomer unit, especially N-(p-aminosulfonylphenyl)methacrylamide; (2) acrylonitrile and/or methacrylonitrile; and (3) methyl methacrylate and/or methyl acrylate.

The infrared absorbing compound (photothermal conversion material) may be in the imageable layer, a separate absorber layer, and/or an underlayer. When an absorber layer is present, it is between the imageable layer and the substrate. When an underlayer is also present, the absorber layer is between the imageable layer and the underlayer. It preferably consists essentially of the photothermal conversion material and, optionally, a surfactant. It may be possible to use less of the photothermal conversion material if it is present in a separate absorber layer rather than either the underlayer and/or the imageable layer. When an absorber layer is present, the imageable layer is preferably substantially free of photothermal conversion material, i.e. the imageable layer preferably does not absorb radiation used for imaging, typically radiation in the range of 800 nm to 1200 nm. The absorber layer preferably has a thickness sufficient to absorb at least 90%, preferably at least 99%, of the imaging radiation. Typically, the absorber layer has a coating weight of about 0.02 g/m$^2$ to about 2 g/m$^2$, preferably about 0.05 g/m$^2$ to about 1.5 g/m$^2$. As described above, the amount of photothermal conversion material in the element is generally sufficient to provide an optical density of at least 0.05, and preferably, an optical density of about 0.5 to about 2 at the imaging wavelength.

Substrate

The imageable composition may be coated over a variety of substrates. The particular substrate will generally be determined by the intended application. For lithographic printing, the substrate comprises a support, which may be any material conventionally used to prepare imageable elements useful as lithographic printing plates. The support is preferably strong, stable and flexible. It should resist dimensional change under conditions of use so that color records will register in a full-color image. Typically, it can be any self-supporting material, including, for example, polymeric films such as polyethylene terephthalate film, ceramics, metals, or stiff papers, or a lamination of any of these materials. Metal supports include aluminum, zinc, titanium, and alloys thereof.

Typically, polymeric films contain a sub-coating on one or both surfaces to modify the surface characteristics to enhance the hydrophilicity of the surface, to improve adhesion to subsequent layers, to improve planarity of paper substrates, and the like. The nature of this layer or layers depends upon the substrate and the composition of subsequent coated layers. Examples of subbing layer materials are adhesion-promoting materials, such as alkoxysilanes, aminopropyltriethoxysilane, glycidoxypropyltriethoxysilane and epoxy functional polymers, as well as conventional subbing materials used on polyester bases in photographic films.

The surface of an aluminum support may be treated by techniques known in the art, including physical graining, electrochemical graining, chemical graining, and anodizing. The substrate should be of sufficient thickness to sustain the wear from printing and be thin enough to wrap around a printing form, typically about 100 $\mu$m to about 600 $\mu$m. Typically, the substrate comprises an interlayer between the aluminum support and the layer of imageable composition. The interlayer may be formed by treatment of the support with, for example, silicate, dextrine, hexafluorosilicic acid, phosphate/fluoride, polyvinyl phosphonic acid (PVPA) or vinyl phosphonic acid copolymers.

The back side of the substrate (i.e., the side opposite the underlayer and layer of imageable composition) may be coated with an antistatic agent and/or a slipping layer or matte layer to improve handling and "feel" of the imageable element. Typically the imageable layer has a coating weight of about 0.5 to about 4 g/m$^2$, preferably 0.8 to 3 g/m$^2$.

Preparation of the Imageable Elements

The imageable element may be prepared by sequentially applying the underlayer over the hydrophilic surface of the substrate; applying the absorber layer or the barrier layer if present, over the underlayer; and then applying the imageable layer using conventional techniques.

The terms "solvent" and "coating solvent" include mixtures of solvents. These terms are used although some or all of the materials may be suspended or dispersed in the solvent rather than in solution. Selection of coating solvents depends on the nature of the components present in the various layers.

The underlayer may be applied by any conventional method, such as coating or lamination. Typically the ingredients are dispersed or dissolved in a suitable coating solvent, and the resulting mixture coated by conventional methods, such as spin coating, bar coating, gravure coating, die coating, or roller coating.

The imageable layer is applied to the substrate or, if present, over the underlayer. If an underlayer is present, to prevent these layers from dissolving and mixing, the imageable layer should be coated from a solvent in which the underlayer layer is essentially insoluble. Thus, the coating solvent for the imageable layer should be a solvent in which the components of the imageable layer are sufficiently soluble that the imageable layer can be formed and in which any underlying layers are essentially insoluble. Typically, the solvents used to coat the underlying layers are more polar than the solvent used to coat the imageable layer. An intermediate drying step, i.e., drying the underlayer, if present, to remove coating solvent before coating the imageable layer over it, may also be used to prevent mixing of the layers. Alternatively, the underlayer, the imageable layer or both layers may be applied by conventional extrusion coating methods from a melt mixture of layer components. Typically, such a melt mixture contains no volatile organic solvents.

Imaging and Processing

Thermal imaging may be carried out by well-known methods. The element may be thermally imaged with a laser or an array of lasers emitting modulated near infrared or infrared radiation in a wavelength region that is absorbed by the imageable element. Infrared radiation, especially infrared radiation in the range of about 800 nm to about 1200 nm, typically at 830 nm or 1064 nm, is typically used for imaging thermally imageable elements. Imaging is conveniently carried out with a laser emitting at about 830 nm or at about 1064 nm. Suitable commercially available imaging devices include image setters such as the Creo Trendsetter (CREO) and the Gerber Crescent 42T (Gerber).

Alternatively, the imageable element may be thermally imaged with a hot body, using, for example, a conventional apparatus containing a thermal printing head. A suitable imaging apparatus includes at least one thermal head but would usually include a thermal head array, such as a TDK Model No. LV5416 used in thermal fax machines and sublimation printers or the GS618-400 thermal plotter (Oyo Instruments, Houston, Tex., USA).

After imaging, the imaged imageable element may be heated. This optional heating step can be carried out by radiation, convection, contact with heated surfaces, for example, with rollers, or by immersion in a heated bath comprising an inert liquid, for example, water. Preferably, the imaged imageable element is heated in an oven.

The heating temperature is typically determined by the fog point of the imageable element. The fog point is defined as the lowest temperature, at a heating time of two minutes, required to render a thermally imageable element non-processable. For negative working elements that comprise an acid generator, the temperature is about 28° C. (about 50° F.) or less below the fog point at a heating time of two minutes, more preferably about 17° C. (about 30° F.) or less below the fog point at a heating time of two minutes and most preferably about 8° C. (about 15° F.) below the fog point at a heating time of two minutes. Typically, the heating temperature is about 110° C. to about 150° C. (about 230° F. to about 300° F.). The heating time can vary widely, depending on the method chosen for the application of heat as well as the other steps in the process. If a heat-transferring medium is used, the heating time will preferably be about 30 seconds to about 30 minutes, more preferably about 1 minute to about 5 minutes. When the imaged imageable element is heated in an oven, the heating time is preferably about 1 minute to about 5 minutes.

Imaging produces an imaged element, which comprises a latent image of imaged regions and complementary unimaged regions. Development of the imaged element to form a printing plate, or printing form, converts the latent image to an image by removing either the imaged regions or unimaged regions, revealing the hydrophilic surface of the underlying substrate.

The developer may be any liquid or solution that can penetrate and remove the unwanted regions of the imageable layer without substantially affecting the complementary regions. Suitable developers depend on the solubility characteristics of the ingredients present in the imageable element.

Common components of developers are surfactants; chelating agents, such as salts of ethylenediamine tetraacetic acid; organic solvents such as benzyl alcohol and phenoxyethanol; and alkaline components such as inorganic metasilicates, organic metasilicates, hydroxides or bicarbonates. Typical surfactants are: alkali metal salts of alkyl naphthalene sulfonates; alkali metal salts of the sulfate monoesters of aliphatic alcohols, typically having six to nine carbon atoms; and alkali metal sulfonates, typically having six to nine carbon atoms. A developer may also comprise a buffer system to keep the pH relatively constant. Numerous buffer systems are known to those skilled in the art. Typically buffer systems include, for example: combinations of water-soluble amines, such as mono-ethanol amine, diethanol amine, tri-ethanol amine, or tri-iso-propyl amine, with a sulfonic acid, such as benzene sulfonic acid or 4-toluene sulfonic acid; mixtures of the tetra sodium salt of ethylene diamine tetracetic acid (EDTA) and EDTA; mixtures of phosphate salts, such as mixtures of mono-alkali phosphate salts with tri-alkali phosphate salts; and mixtures of alkali borates and boric acid. Water typically comprises the balance of the developer.

High pH developers are typically used for positive working imageable elements, and solvent-based developers are typically used for negative working imageable elements. High pH developers can also be satisfactorily used with negative working imageable elements when the imageable layer comprises a phenolic polymer, such as a novolac resin. A high pH developer typically has a pH of at least about 11, more typically at least about 12, preferably about 12 to about 14.

High pH developers comprise at least one alkali metal silicate, such as lithium silicate, sodium silicate, and/or potassium silicate. Sodium silicate and potassium silicate are preferred, and potassium silicate is most preferred. A mixture of alkali metal silicates may be used if desired. Especially preferred high pH developers comprise an alkali metal silicate having a $SiO_2$ to $M_2O$ weight ratio of at least of at least about 0.3, in which M is the alkali metal. Preferably, the ratio is about 0.3 to about 1.2. More preferably, it is about 0.6 to about 1.1, and most preferably, it is about 0.7 to about 1.0.

The amount of alkali metal silicate in the high pH developer is typically at least 20 g of $SiO_2$ per 1000 g of developer (that is, at least about 2 wt %) and preferably about 20 g to 80 g of $SiO_2$ per 1000 g of developer (that is, about 2 wt % to about 8 wt %). More preferably, it is about 40 g to 65 g of $SiO_2$ per 1000 g of developer (that is, about 4 wt % to about 6.5 wt %).

In addition to the alkali metal silicate, alkalinity can be provided by a suitable concentration of any suitable base, such as, for example, ammonium hydroxide, sodium hydroxide, lithium hydroxide, and/or potassium hydroxide. A preferred base is potassium hydroxide. Optional components of high pH developers are anionic, nonionic and amphoteric surfactants (up to 3% on the total composition weight), biocides (antimicrobial or antifungal agent), antifoaming agents or chelating agents (such as alkali gluconates), and thickening agents (water soluble or water dispersible polyhydroxy compounds such as glycerin or polyethylene glycol). However, these developers typically do not contain organic solvents. Typical commercially available high pH developers include: Goldstar™ Developer, ProTherm™ Developer, 4030 Developer, PD-1 Developer, and MX Developer, all available from Kodak Polychrome Graphics, Norwalk, Conn.

Solvent based alkaline developers comprise an organic solvent or a mixture of organic solvents. The developer is a single phase. Consequently, the organic solvent or mixture of organic solvents must be either miscible with water or sufficiently soluble in the developer that phase separation does not occur. The following solvents and mixtures thereof are suitable for use in the developer: the reaction products of phenol with ethylene oxide and propylene oxide, such as ethylene glycol phenyl ether (phenoxyethanol); benzyl alcohol; esters of ethylene glycol and of propylene glycol with acids having six or fewer carbon atoms, and ethers of ethylene glycol, diethylene glycol, and of propylene glycol with alkyl groups having six or fewer carbon atoms, such as 2-ethoxyethanol and 2-butoxyethanol. A single organic solvent or a mixture of organic solvents can be used. The organic solvent is typically present in the developer at a concentration of between about 0.5 wt % to about 15 wt %, based on the weight of the developer, preferably between about 3 wt % and about 5 wt %, based on the weight of the developer. Typical commercially available solvent based developers include 956 Developer, and 955 Developer, available from Kodak Polychrome Graphics, Norwalk, Conn.

The developer is typically applied to the imaged precursor by spraying the element with sufficient force to remove the imaged regions. Alternatively, development may carried out in a processor equipped with an immersion-type developing bath, a section for rinsing with water, a gumming section, a drying section, and a conductivity-measuring unit, or the imaged precursor may be brushed with the developer. In each instance, a printing plate is produced. Development may conveniently be carried out in a commercially available spray-on processor, such as an 85 NS (Kodak Polychrome Graphics).

Following development, the printing plate is rinsed with water and dried. Drying may be conveniently carried out by infrared radiators or with hot air. After drying, the printing plate may be treated with a gumming solution comprising one or more water-soluble polymers, for example polyvinylalcohol, polymethacrylic acid, polymethacrylamide, polyhydroxyethylmethacrylate, polyvinylmethylether, gelatin, and polysaccharide such as dextrine, pullulan, cellulose, gum arabic, and alginic acid. A preferred material is gum arabic.

A developed and gummed plate may also be baked to increase the run length of the plate. Baking can be carried out, for example at about 220° C. to about 240° C. for about 7 to 10 minutes, or at a temperature of about 120° C. for about 30 min.

INDUSTRIAL APPLICABILITY

The infrared absorbing compounds are useful as photothermal conversion materials in imageable elements. The imageable elements are useful in photomask lithography, imprint lithography, microelectronic and microoptical devices, photoresists for the preparation of printed circuit boards, and for the preparation of lithographic printing plate precursors. When the imageable elements are used to prepare lithographic printing plates, the dots have high stability.

The imageable elements are especially useful for the preparation of lithographic printing plate precursors. Once the imageable element has been imaged and developed to form a lithographic printing plate or printing form, printing can then be carried out by applying a fountain solution and then lithographic ink to the image on its surface. The fountain solution is taken up by the unimaged regions, i.e., the surface of the hydrophilic substrate revealed by the imaging and development process, and the ink is taken up by the imaged regions, i.e., the regions of the layer of imageable composition not removed by the development process. The ink is then transferred to a suitable receiving material (such as cloth, paper, metal, glass or plastic) either directly or indirectly using an offset printing blanket to provide a desired impression of the image thereon.

The advantageous properties of this invention can be observed by reference to the following examples, which illustrate but do not limit the invention.

EXAMPLES

In the Examples, "coating solution" refers to the mixture of solvent or solvents and additives coated, even though some of the additives may be in suspension rather than in solution. Except where indicated, the indicated percentages are percentages by weight based on the total solids in the coating solution.

| | Glossary |
|---|---|
| BYK 307 | Polyethoxylated dimethylpolysiloxane copolymer (Byk-Chemie, Wallingford, CT, USA) |
| BYK 333 | Polyether modified dimethylpolysiloxane copolymer (Byk-Chemie, Wallingford, CT, USA) |
| D11 | Ethanaminium, N-[4-[[4-(diethylamino)phenyl][4-(ethylamino)-1-naphthalenyl]methylene]-2,5-cyclohexadien-1-ylidene]-N-ethyl-, salt with 5-benzoyl-4-hydroxy-2-methoxybenzenesulfonic acid (1:1); colorant dye (see structure below) (PCAS, Longjumeau, France) |
| DOWANOL ® PM | Propylene glycol methyl ether (Dow, Midland, MI, USA) |
| IR Dye 66e | 2-[2-[3-[(1,3-Dihydro-1,3,3-trimethyl-2H-indol-2-ylidene)ethylidene]-2-(phenylthio)-1-cyclohexen-1-yl]ethenyl]-1,3,3-trimethyl-3H-indolium chloride; lambda$_{max}$ = 788 nm (FEW, Germany) |
| IR Dye A | Infrared absorbing compound (see structure below) (Eastman Kodak, Rochester, NY, USA) |
| MSOS | 2-Methoxy-4-(phenylamino)-benzenediazonium octyl sulfate, an acid generator |
| N-13 | Novolac resin; 100% m-cresol; MW 13,000 (Eastman Kodak Rochester, NY, USA) |
| ProTherm ™ | Aqueous alkaline positive developer (Kodak Polychrome Graphics, Norwalk, CT, USA) |
| Resole resin | Resole resin GP649D99 (Georgia-Pacific, Atlanta, GA, USA) |

IR Dye A

-continued

Glossary

D11

Dye 66e

Example 1

This example illustrates formation of 2-[2-[2-chloro-3-[(1,3-dihydro-1,3,3-trimethyl-2H-indol-2-ylidene)ethylidene]-1-cyclohexen-1-yl]ethenyl]-1,3,3-trimethyl-3H-indolium, salt with 2-[2-[2-chloro-3-[(1,3-dihydro-1,1,3-trimethyl-7-sulfo-2H-benz[e]indol-2-ylidene)ethylidene]-1-cyclohexen-1-yl]ethenyl]-1,1,3-trimethyl-7-sulfo-1H-benz[e]indolium inner salt (Compound 1), an infrared absorbing compound of the invention.

Compound 1

5.6 g of 2-[2-[2-chloro-3-[(1,3-dihydro-1,3,3-trimethyl-2H-indol-2-ylidene)ethylidene]-1-cyclohexen-1-yl]ethenyl]-1,3,3-trimethyl-3H-indolium bromide (Honeywell Specialty Chemicals, NJ) was dissolved in 100 g of water and 100 g of DOWANOL® PM (solution A). 9.3 g of N,N-dibutyl-1-butanamine compound with, 2-[2-[2-chloro-3-[(1,3-dihydro-1,1,3-trimethyl-7-sulfo-2H-benz[e]indol-2-ylidene)ethylidene]-1-cyclohexen-1-yl]ethenyl]-1,1,3-trimethyl-7-sulfo-1H-benz[e]indolium inner salt (Eastman Kodak, Rochester, N.Y.) was dissolved in 100 g of water and 300 g of DOWANOL® PM (solution B). Solution A was slowly added to solution B with stirring. Then 600 g of water was added to form a precipitate. The reaction mixture was stirred for another 10 minutes and stored in the dark at room temperature for 2 hours. The precipitate was collected by filtration, washed with 50 ml of acetone, and dried at ambient temperature for 12 hours. Yield: 13.0 g.

Proton NMR (in DMSO-$d_6$): δ 1.67 (12H, s), 1.88 (4H, br), 1.95 (12H, s), 2.74 (8H, m), 3.69 (6H, s), 3.81 (6H, s), 6.32 (4H, m), 7.20–8.50 (22H, m).

Example 2

This example illustrates formation of 2-[2-[3-[(1,3-dihydro-1,3,3-trimethyl-2H-indol-2-ylidene)ethylidene]-2-(phenylthio)-1-cyclohexen-1-yl]ethenyl]-1,3,3-trimethyl-3H-indolium, salt with 2-[2-[2-chloro-3-[(1,3-dihydro-1,1,3-trimethyl-7-sulfo-2H-benz[e]indol-2-ylidene)ethylidene]-1-cyclohexen-1-yl]ethenyl]-1,1,3-trimethyl-7-sulfo-1H-benz[e]indolium inner salt (Compound 2), an infrared absorbing compound of the invention.

Compound 2

0.60 g of IR Dye 66e was dissolved in 10 g of water and 10 g of DOWANOL® PM (solution C). 0.93 g of N,N-dibutyl-1-butanamine compound with, 2-[2-[2-chloro-3-[(1,3-dihydro-1,1,3-trimethyl-7-sulfo-2H-benz[e]indol-2-ylidene)ethylidene]-1-cyclohexen-1-yl]ethenyl]-1,1,3-trimethyl-7-sulfo-1H-benz[e]indolium inner salt (Eastman Kodak, Rochester, N.Y.) was dissolved in 10 g of water and 30 g of DOWANOL® PM (solution D). Solution C was slowly added to solution D with stirring. Then 60 g of water was added to form a precipitate. The reaction mixture was stirred for another 10 minutes and stored in the dark at room temperature for 3 hours. The precipitate was collected by filtration, washed with 50 ml of acetone, and dried at ambient temperature for 12 hours. Yield: 0.93 g.

Proton NMR (in acetone-$d_6$): δ 1.41 (12H, s), 1.90 (4H, br), 1.95 (12H, s), 2.76 (8H, m), 3.64 (6H, s), 3.81 (6H, s), 6.34 (4H, m), 7.00–8.70 (27H, m).

Comparative Example 1

A coating solution was prepared by combining 6.8 g of a DOWANOL® PM solution containing 25% of resole resin, 8.56 g of an acetone solution containing 34% N-13, 0.60 g of MSOS, 0.471 g of IR dye A; 0.07 g of D11, 0.21 g and 0.05 g of 10% BYK 307 and 10% BYK 333 respectively in 49.06 g of 1-methoxy-2-propanol, 32.9 g of N,N-dimethylformide, 0.94 g of water, and 0.34 g of acetone. An electrochemically grained and anodized aluminum substrate, post-treated with polyvinylphosphoric acid (PVPA), was coated with above solution with a dry coating weight of about 1.4 g/m² (about 130 mg/ft²) and dried at 88° C. (190° F.) for about 2 minutes on a rotating drum.

The resulting imageable element was imaged with a CREO Trendsetter 3244x image setter (CreoScitex, Bumaby, British Columbia, Canada) at 830 nm at a power of 5.5 W and a range of drum speeds of 96 to 250 rpm (50 to 130 mJ/cm²). The imaged imageable elements were preheated in a Heavy Duty Oven (Wisconsin Oven Corp., East Troy, Wis.) at a temperature of about 133° C. (about 271° F.) for about 2 minutes and developed in a Unigraph Quartz K85 processor (Glunz & Jensen, Norfolk, England) charged with ProTherm™ developer at 25° C.

Figure 1:
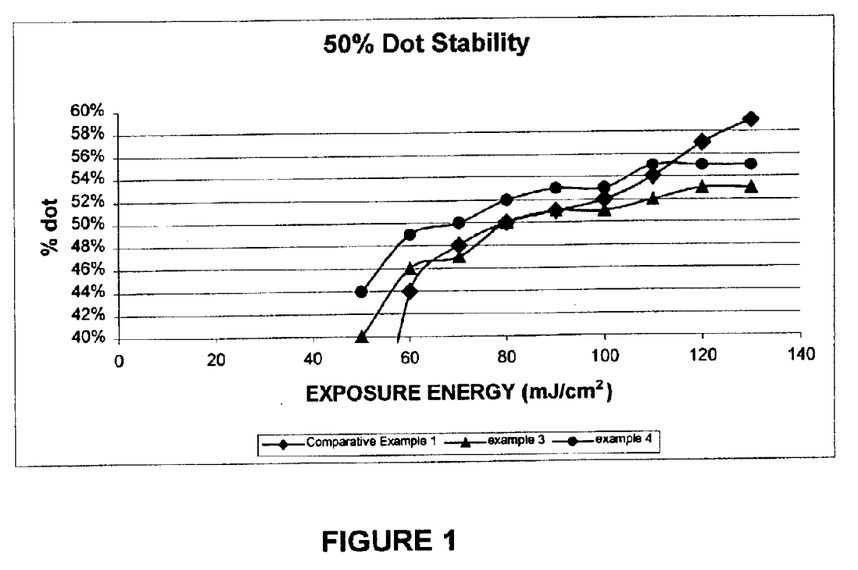
FIG. 1 shows the variation of the 50% dot with variation in exposure for Comparative Example 1 and Examples 3 and 4.

The minimum exposure energy to achieve maximum processed density was about 70 mJ/cm². The stability of the 50% dot screens over the exposure dose range is shown in FIG. 1.

Example 3

A coating solution was prepared by combining 6.8 g of a DOWANOL® PM solution containing 25% of resole resin, 8.56 g of an acetone solution containing 34% N-13, 0.60 g of MSOS, 0.383 g of the infrared absorbing compound prepared in Example 1, 0.07 g of D11, 0.21 g and 0.05 g of 10% BYK 307 and 10% BYK 333 respectively in 49.15 g of 1-methoxy-2-propanol, 32.9 g of N,N-dimethylformide, 0.94 g of water, and 0.34 g of acetone. The substrate of Comparative Example 1 was coated with the coating solution and the resulting imageable element dried at 88° C. (190° F.) for about 2 minutes on a rotating drum. The dry coating weight was about 1.4 g/m² (about 130 mg/ft²).

The resulting imageable elements were imaged and processed as described in Comparative Example 1. The minimum exposure energy to achieve maximum processed density was about 70 mJ/cm². The stability of the 50% dot screens over the exposure dose range is shown in FIG. 1.

Example 4

A coating solution was prepared by dissolving 6.8 g of a DOWANOL® PM solution containing 25% of resole resin, 8.56 g of an acetone solution containing 34% N-13, 0.60 g of MSOS, 0.408 g of the infrared absorbing compound prepared in Example 2, 0.07 g of D11, 0.21 g and 0.05 g of 10% BYK 307 and 10% BYK 333 respectively in 49.15 g of 1-methoxy-2-propanol, 32.9 g of N,N-dimethylformide, 0.94 g of water, and 0.34 g of acetone. The substrate of Comparative Example 1 was coated with coating solution and the resulting imageable element dried at 88° C. (190° F.) for about 2 minutes on a rotating drum. The dry coating weight was about 1.4 g/m² (about 130 mg/ft²).

The resulting imageable elements were imaged and processed as described in Comparative Example 1. The minimum exposure energy to achieve maximum processed density was about 70 mJ/cm². The stability of the 50% dot screens over the exposure dose range is shown in FIG. 1.

Example 5

This example illustrates the synthesis of 2-methoxy-4-(phenylamino)-benzenediazonium octyl sulfate (MSOS), an acid generator.

64.0 g of 35% sodium octyl sulfate (Aldrich, Milwaukee, Wis.) in water was slowly added in 31.0 g of 2-methoxy-4-(phenylamino)-benzenediazonium bisulfate (Diverstec, Fort Collins, Colo.) in 500 ml of water with stirring. The resulting mixture was stored in the dark at 0–5° C. for 5 hours. After the water was decanted, the resulting oil was dissolved in 200 ml of ethyl acetate. The resulting solution was washed with 50 ml of 5% aqueous sodium bicarbonate and with 50 ml of water. The organic layer was dried over anhydrous magnesium sulfate for 6 hours and the solvent removed by vacuum. 35.1° g of oil was obtained.

Proton NMR (in acetone-$d_6$): δ 0.84 (3H,t), 1.22 (10H, m), 1.53 (2H, p), 3.88 (2H,t), 4.10 (3H,s), 6.50–7.60 (7H, m), 8.17 (1H, d), and 10.9 (1H,s).

Having described the invention, we now claim the following and their equivalents.

What is claimed is:

1. An infrared absorbing compound of the structure:

in which:

$Y_1$ and $Y_2$ are each independently hydrogen, halo, alkyl, diphenylamino, or phenylthio;

$R_1$, $R_2$, $R_3$, and $R_4$ are each independently hydrogen, methyl, or $SO_3^-$, with the proviso that two of $R_1$, $R_2$, $R_3$, and $R_4$ are $SO_3^-$;

$R_5$ and $R_6$ are each independently an alkyl group;

$Z_1$, $Z_2$, $Z_4$, and $Z_5$ are each independently a benzo group or a naphtho group;

$Z_3$ and $Z_6$ are each independently two hydrogen atoms, a cyclohexene residue, or a cyclopentene residue;

$X_1$, $X_2$, $X_3$, and $X_4$ are each independently S, O, NH, $CH_2$, or $C(CH_3)_2$; and $n_1$ and $n_2$ are each independently 0 to 4.

2. The compound of claim 1 in which $Z_3$ and $Z_6$ are each a cyclohexene residue or a cyclopentene residue, and $n_1$ and $n_2$ are each independently 1 to 4.

3. The compound of claim 2 in which $Y_1$ and $Y_2$ are each independently hydrogen, chloro, phenylthio, or diphenylamino.

4. The compound of claim 3 in which $R_5$ and $R_6$ are each an alkyl group of one to four carbon atoms.

5. The compound of claim 4 in which $R_1$ and $R_2$ are the same; $R_3$ and $R_4$ are the same; $R_5$ and $R_6$ are the same; $Z_1$ and $Z_2$ are the same; $Z_4$, and $Z_5$ are the same; $X_1$ and $X_2$ are the same; $X_3$, and $X_4$ are the same; and $n_1$ and $n_2$ are the same.

6. The compound of claim 1 in which $R_1$ and $R_2$ are the same; $R_3$ and $R_4$ are the same; $R_5$ and $R_6$ are the same; $Z_1$ and $Z_2$ are the same; $Z_4$, and $Z_5$ are the same; $X_1$ and $X_2$ are the same; $X_3$, and $X_4$ are the same; and $n_1$ and $n_2$ are the same.

7. The compound of claim 6 in which $R_5$ and $R_6$ are each an alkyl group of one to four carbon atoms; $Z_3$ and $Z_6$ are each a cyclohexene residue or a cyclopentene residue; and $n_1$ and $n_2$ are each 1 to 4.

8. An imageable element comprising an imageable layer over a substrate in which:

the imageable layer comprises an imageable composition; and the imageable element comprises an infrared absorbing compound of the structure:

in which:

$Y_1$ and $Y_2$ are each independently hydrogen, halo, alkyl, diphenylamino, or phenylthio;

$R_1$, $R_2$, $R_3$, and $R_4$ are each independently hydrogen, methyl, or $SO_3^-$, with the proviso that two of $R_1$, $R_2$, $R_3$, and $R_4$ are $SO_3^-$;

$R^5$ and $R^6$ are each independently an alkyl group;

$Z_1$, $Z_2$, $Z_4$, and $Z_5$ are each independently a benzo group or a naphtho group;

$Z_3$ and $Z_6$ are each independently two hydrogen atoms, a cyclohexene residue, or a cyclopentene residue;

$X_1$, $X_2$, $X_3$, and $X_4$ are each independently S, O, NH, $CH_2$, or $C(CH_3)_2$; and $n_1$ and $n_2$ are each independently 0 to 4.

9. The imageable element of claim 8 in which the imageable composition comprises:

the infrared absorbing compound;

an acid generator;

an acid activatable crosslinking agent; and a polymeric binder.

10. The imageable element of claim 9 in which $R_1$ and $R_2$ are the same; $R_3$ and $R_4$ are the same; $R_5$ and $R_6$ are the same; $Z_1$ and $Z_2$ are the same; $Z_4$, and $Z_5$ are the same; $X_1$ and $X_2$ are the same; $X_3$, and $X_4$ are the same; and $n_1$ and $n_2$ are the same.

11. The imageable element of claim 10 in which:

$Z_3$ and $Z_6$ are each a cyclohexene residue or a cyclopentene residue;

$Y_1$ and $Y_2$ are each independently hydrogen, chloro, phenylthio, or diphenylamino;

$R^5$ and $R^6$ are each an alkyl group of one to four carbon atoms; and $n_1$ and $n_2$ are each independently 1 to 4.

12. The imageable element of claim 8 in which:

the imageable element additionally comprises an underlayer between the imageable layer and the substrate; and the imageable layer comprises a phenolic resin and a dissolution inhibitor.

13. The imageable element of claim 12 in which the infrared absorbing compound is in the underlayer or in an absorber layer between the imageable layer and the underlayer.

14. The imageable element of claim 13 in which $R_1$ and $R_2$ are the same; $R_3$ and $R_4$ are the same; $R_5$ and $R_6$ are the same; $Z_1$ and $Z_2$ are the same; $Z_4$, and $Z_5$ are the same; $X_1$ and $X_2$ are the same; $X_3$, and $X_4$ are the same; and $n_1$ and $n_2$ are the same.

15. The imageable element of claim 14 in which:

$Z_3$ and $Z_6$ are each a cyclohexene residue or a cyclopentene residue;

$Y_1$ and $Y_2$ are each independently hydrogen, chloro, phenylthio, or diphenylamino;

$R_5$ and $R_6$ are each an alkyl group of one to four carbon atoms; and $n_1$ and $n_2$ are each independently 1 to 4.

16. The imageable element of claim 8 in which $R_1$ and $R_2$ are the same; $R_3$ and $R_4$ are the same; $R_5$ and $R_6$ are the same; $Z_1$ and $Z_2$ are the same; $Z_4$, and $Z_5$ are the same; $X_1$ and $X_2$ are the same; $X_3$, and $X_4$ are the same; and $n_1$ and $n_2$ are the same.

17. The imageable element of claim 16 in which:
$Z_3$ and $Z_6$ are each a cyclohexene residue or a cyclopentene residue;
$Y_1$ and $Y_2$ are each hydrogen, chloro, phenylthio, or diphenylamino;
$R_5$ and $R_6$ are each an alkyl group of one to four carbon atoms; and
$n_1$ and $n_2$ are each 1 to 4.

18. A method for forming an image, the method comprising the steps of:
(a) thermally imaging an imageable element and forming an imaged imageable element comprising imaged regions and complementary unimaged regions; and
(b) developing the imaged imageable element and removing either the imaged regions or the unimaged regions to form the image;
in which:
imageable element comprises an imageable layer over a substrate;
the imageable layer comprises an imageable composition; and
the imageable element comprises an infrared absorbing compound of the structure:

in which:
$Y_1$ and $Y_2$ are each independently hydrogen, halo, alkyl, diphenylamino, or phenylthio;
$R_1$, $R_2$, $R_3$, and $R_4$ are each independently hydrogen, methyl, or $SO_3^-$, with the proviso that two of $R_1$, $R_2$, $R_3$, and $R_4$ are $SO_3^-$;
$R^5$ and $R^6$ are each independently an alkyl group;
$Z_1$, $Z_2$, $Z_4$, and $Z_5$ are each independently a benzo group or a naphtho group;
$Z_3$ and $Z_6$ are each independently two hydrogen atoms, a cyclohexene residue, or a cyclopentene residue;
$X_1$, $X_2$, $X_3$, and $X_4$ are each independently S, O, NH, $CH_2$, or $C(CH_3)_2$; and
$n_1$ and $n_2$ are each independently 0 to 4.

19. The method of claim 18 in which imaging is carried out with infrared or near infrared radiation.

20. The method of claim 19 in which:
the imageable composition comprises:
the infrared absorbing compound;
an acid generator;
an acid activatable crosslinking agent; and
a polymeric binder;
the method additionally comprises, after step (a) and before step (b), the step of heating the imaged imageable element; and
the unimaged regions are removed in step (b).

21. The method of claim 20 in which:
$Z_3$ and $Z_6$ are each a cyclohexene residue or a cyclopentene residue;
$Y_1$ and $Y_2$ are each independently hydrogen, chloro, phenylthio, or diphenylamino;
$R_5$ and $R_6$ are each an alkyl group of one to four carbon atoms;
$n_1$ and $n_2$ are each 1 to 4; and
$R_1$ and $R_2$ are the same; $R_3$ and $R_4$ are the same; $R_5$ and $R_6$ are the same; $Z_1$ and $Z_2$ are the same; $Z_4$, and $Z_5$ are the same; $X_1$ and $X_2$ are the same; $X_3$, and $X_4$ are the same; and $n_1$ and $n_2$ are the same.

22. The method of claim 19 in which:
the imageable element additionally comprises an underlayer between the imageable layer and the substrate;
the imageable layer comprises a phenolic resin and a dissolution inhibitor; and
the imaged regions are removed in step (b).

23. The method of claim 22 in which:
$Z_3$ and $Z_6$ are each a cyclohexene residue or a cyclopentene residue;
$Y_1$ and $Y_2$ are each hydrogen, chloro, phenylthio, or diphenylamino;
$R_5$ and $R_6$ are each an alkyl group of one to four carbon atoms;
$n_1$ and $n_2$ are each 1 to 4; and
$R_1$ and $R_2$ are the same; $R_3$ and $R_4$ are the same; $R_5$ and $R_6$ are the same; $Z_1$ and $Z_2$ are the same; $Z_4$, and $Z_5$ are the same; $X_1$ and $X_2$ are the same; $X_3$, and $X_4$ are the same; and $n_1$ and $n_2$ are the same.

24. The method of claim 23 in which the infrared absorbing compound is in the underlayer or in an absorber layer between the imageable layer and the underlayer.

25. The method of claim 19 in which:
the imageable element does not comprise an underlayer between the imageable layer and the substrate;
the imageable layer comprises a phenolic resin and a dissolution inhibitor; and
the imaged regions are removed in step (b).

26. The method of claim 25 in which:
$Z_3$ and $Z_6$ are each a cyclohexene residue or a cyclopentene residue;
$Y_1$ and $Y_2$ are each hydrogen, chloro, phenylthio, or diphenylamino;
$R_5$ and $R_6$ are each an alkyl group of one to four carbon atoms;
$n_1$ and $n_2$ are each 1 to 4; and
$R_1$ and $R_2$ are the same; $R_3$ and $R_4$ are the same; $R_5$ and $R_6$ are the same; $Z_1$ and $Z_2$ are the same; $Z_4$, and $Z_5$ are the same; $X_1$ and $X_2$ are the same; $X_3$, and $X_4$ are the same; and $n_1$ and $n_2$ are the same.

27. The method of claim 26 in which the infrared absorbing compound is in the imageable layer.

28. The method of claim 19 in which:
$Z_3$ and $Z_6$ are each a cyclohexene residue or a cyclopentene residue;
$Y_1$ and $Y_2$ are each hydrogen, chloro, phenylthio, or diphenylamino;
$R_5$ and $R_6$ are each an alkyl group of one to four carbon atoms;
$n_1$ and $n_2$ are each 1 to 4; and
$R_1$ and $R_2$ are the same; $R_3$ and $R_4$ are the same; $R_5$ and $R_6$ are the same; $Z_1$ and $Z_2$ are the same; $Z_4$, and $Z_5$ are the same; $X_1$ and $X_2$ are the same; $X_3$, and $X_4$ are the same; and $n_1$ and $n_2$ are the same.

* * * * *

UNITED STATES PATENT AND TRADEMARK OFFICE
CERTIFICATE OF CORRECTION

PATENT NO. : 6,790,590 B2  
DATED : September 14, 2004  
INVENTOR(S) : Collins et al.

Page 1 of 1

It is certified that error appears in the above-identified patent and that said Letters Patent is hereby corrected as shown below:

Column 21,  
Line 42, delete "$Z_4,$" and insert -- $Z_4$ --  
Line 43, delete "$X_3,$" and insert -- $X_3$ --  
Line 47, delete "$Z_4,$" and insert -- $Z_4$ --  
Line 48, delete "$X_3,$" and insert -- $X_3$ --

Column 22,  
Line 33, delete "$Z_4,$" and insert -- $Z_4$ --  
Line 34, delete "$X_3,$" and insert -- $X_3$ --  
Line 57, delete "$Z_4,$" and insert -- $Z_4$ --  
Line 58, delete "$X_3,$" and insert -- $X_3$ --

Column 23,  
Line 3, delete "$Z_4,$" and insert -- $Z_4$ --  
Line 4, delete "$X_3,$" and insert -- $X_3$ --  
Line 21, before "imageable" insert -- the --

Column 24,  
Line 7, delete "$Z_4,$" and insert -- $Z_4$ --  
Line 8, delete "$X_3,$" and insert -- $X_3$ --  
Line 27, delete "$Z_4,$" and insert -- $Z_4$ --  
Line 28, delete "$X_3,$" and insert -- $X_3$ --  
Line 49, delete "$Z_4,$" and insert -- $Z_4$ --  
Line 50, delete "$X_3,$" and insert -- $X_3$ --  
Line 63 delete "$Z_4,$" and insert -- $Z_4$ --  
Line 64, delete "$X_3,$" and insert -- $X_3$ --

Signed and Sealed this

Fifteenth Day of February, 2005

JON W. DUDAS  
*Director of the United States Patent and Trademark Office*